April 19, 1949.  J. FRISONE  2,467,469
PORTABLE HEATING APPARATUS

Filed July 2, 1946  2 Sheets-Sheet 1

INVENTOR.
John Frisone
BY Victor J. Evans & Co.
ATTORNEYS

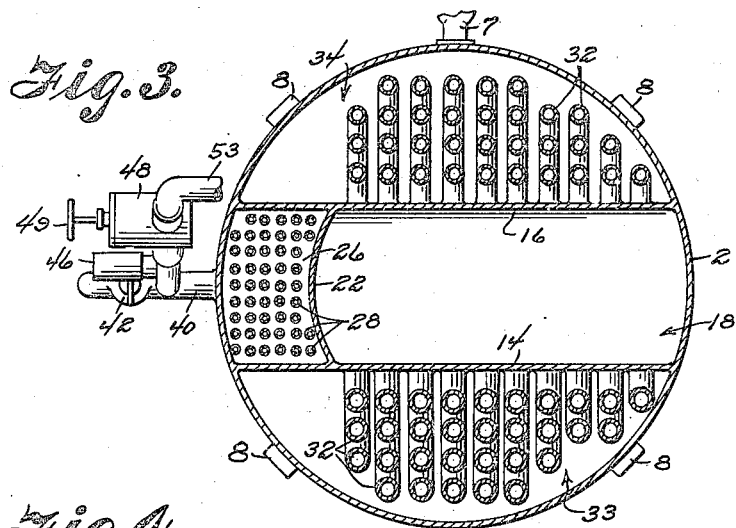
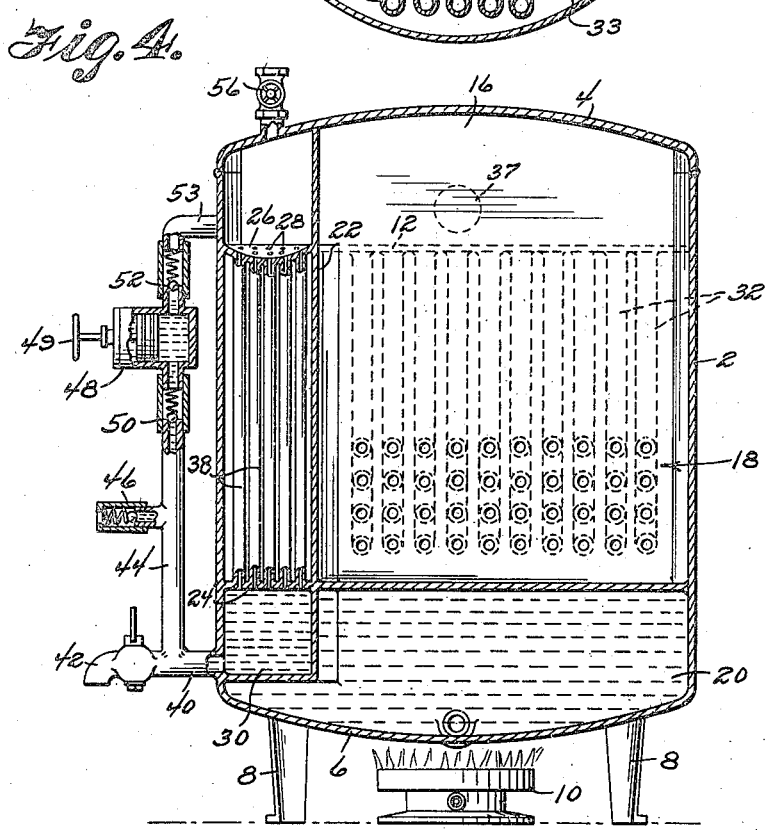

Patented Apr. 19, 1949

2,467,469

UNITED STATES PATENT OFFICE 2,467,469

PORTABLE HEATING APPARATUS

John Frisone, Parris Island, S. C.

Application July 2, 1946, Serial No. 681,025

3 Claims. (Cl. 237—17)

My present invention relates to an improved heating apparatus and more particularly such heating apparatus wherein air is heated by convection in contact with tubes containing hot water. The invention also includes means for supplying water from a reservoir in which preliminary heating is accomplished.

In the accompanying drawings I have illustrated one complete example of the physical embodiment of my invention according to the best mode I have thus far devised but it will be understood that various changes and alterations may be made in the exemplified structure within the scope of the appended claims.

In the drawings—

Figure 3 is a horizontal sectional view taken at line 3—3 of Figure 2; and

Figure 4 is a vertical sectional view at line 4—4 of Figure 1.

Figure 1:
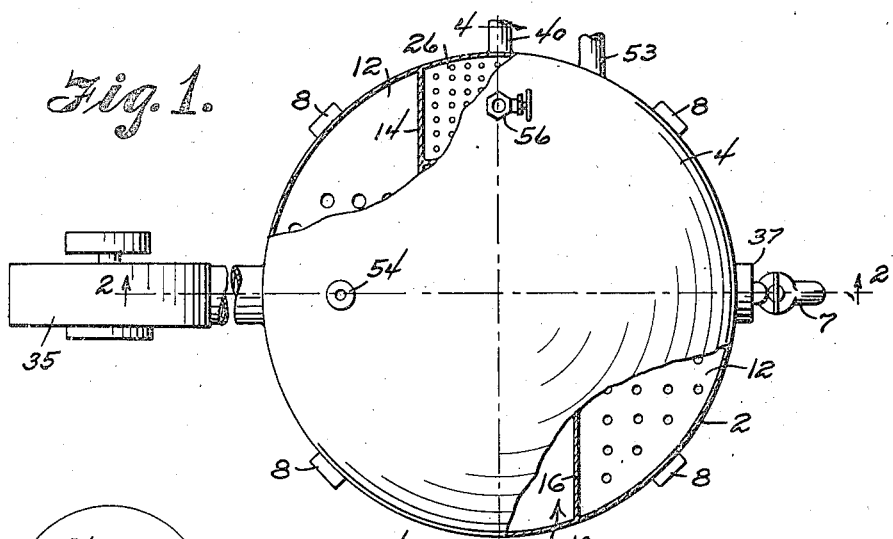
Figure 1 is a top plan view of the heater of my invention.
Figure 2:
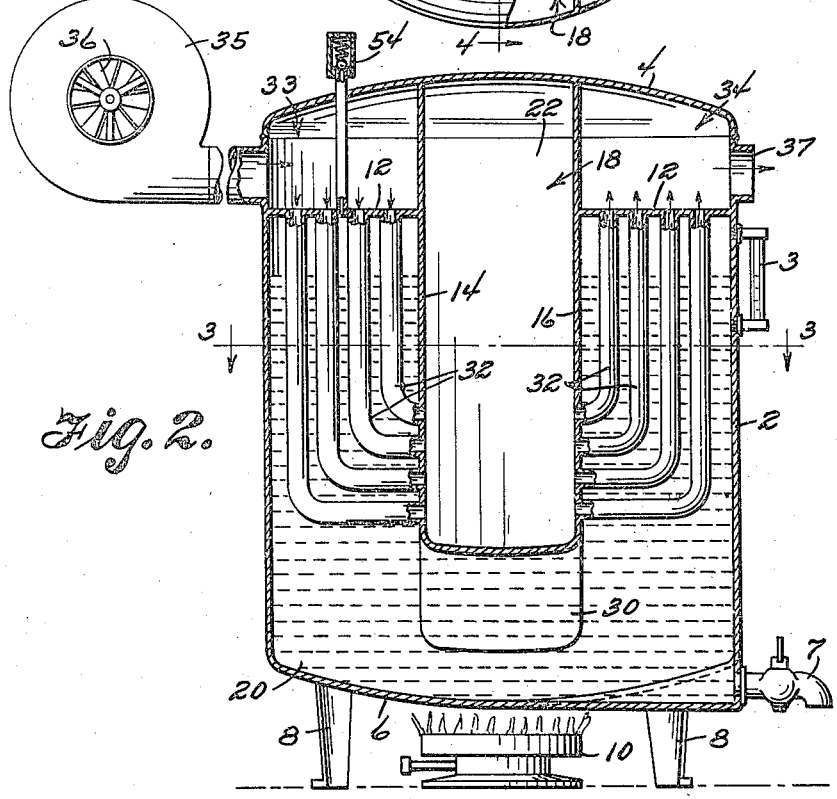
Figure 2 is a vertical sectional view thereof taken at line 2—2 of Figure 1.

Referring now to the drawings in detail, I have illustrated the heater of my invention embodying a cylindrical casing 2 with the exterior thermometer 3, and formed with a closed top 4 and a closed bottom 6 with the drain 7 therein. The legs 8 support the cylinder 2 above the burner 10.

Within the cylinder I provide a horizontal partition 12 to which are attached vertical, spaced walls 14 and 16 forming a central chamber 18 in the casing, about which is located the U-shaped water jacket 20. A vertical wall 22 divides the central chamber from the entrance chamber which is fashioned with a bottom 24 and top 26.

A lower tank or reservoir 30 is positioned below the bottom 24 of the entrance chamber.

The air tubes 32 of suitable material and formed to desired shape, as shown, connect the chamber 33 with the chamber 34 and air from the blower 35 and its fan 36 is forced into the chamber 33 through the tubes 32 into the chamber 34 and out through the air outlet 37.

The water tubes 38 permit the passage of water through the top 26 and bottom 24 of the entrance chamber from the water inlet 56 and the water after flowing downwardly through said pipes is stored in the reservoir 30.

An outlet pipe 40 from the reservoir 30 is provided with a tap or faucet 42 and the vertical pipe 44 permits the gravity flow of water upwards therein to the pump 48 having the opposite one-way ball valves 50 and 52. The pump when operated by the handle 49 will lift the water in the pipe 44 from the reservoir 30 through the valves and thence through the inlet pipe 53 to the water chamber 20. As the water in the water jacket 20 is heated from the burner, the heat will be transmitted through the wall of the reservoir to the water therein, so that the water added to the jacket from the reservoir will have received a preliminary heat and will not effect a cooling action on the air passing through the air tubes 32.

A steam relief valve 54 will permit the escape of any steam in the water jacket should the pressure rise to a predetermined level.

In operation, the water in the jacket will be heated as desired by the burner 10, and water may be added thereto by the pump from the reservoir as is necessary. Air under pressure from the blower will be forced through the air tubes and the air will be heated by convection during its passage therethrough.

The air so heated will be exhausted through the outlet 37 and may be recirculated if desirable. The water in the jacket may be heated to a constant temperature, and hot water for washing or similar purposes will be readily available through the tap 42.

The heater of my invention is compact in construction and efficient in operation, and due to the manner of construction is portable and may be placed wherever desired. A constant water supply from outside is not necessary as the evaporation of water will be minimized inasmuch as the water jacket is sealed except for the relief valve permitting the escape of steam under too high pressure.

The air passing first into the chamber 33 and through the pipes 32 will be permitted to expand and circulate through the central chamber 18 and the air will then leave the chamber 18 for passage through the pipes 32 to the chamber 34 and thence to exhaust.

Having thus fully described my invention, what I claim as new and desire to secure by Letters Patent is:

1. An air heater comprising a cylindrical casing having a closed top and bottom, interior vertically disposed parallel walls, a bottom portion connecting the lower ends of said walls to form a central air chamber, said walls and said casing forming a water jacket about said central air chamber, horizontal partitions in said water jacket below the closed top of said casing, forming two oppositely disposed air chambers, air tubes carried by one of said partitions and one of said walls and communicating with a blower connected to the chamber formed by said latter partition and the central chamber, and air tubes communicating with the central chamber and the other of said chambers formed by the other of said partitions, an exhaust port for the latter chamber, means for heating the water in the jacket, and means for supplying pre-heated water to the jacket.

2. The invention as in claim 1 wherein the means for heating the water in the water jacket comprises a water reservoir in heat transmitting relation with the water jacket, and the means for supplying pre-heated water to the water jacket from the reservoir comprises a pump connected to said water jacket and said reservoir.

3. The invention as in claim 1 wherein a reservoir for supplying pre-heated water is formed in said casing within said water jacket, a pipe connecting the reservoir with the water jacket, a pump interpolated in the pipe, and valve means in the pipe on both sides of the pump permitting one-way passage of water therethrough.

JOHN FRISONE.

REFERENCES CITED

The following references are of record in the file of this patent:

UNITED STATES PATENTS

| Number | Name | Date |
| --- | --- | --- |
| 1,510,695 | Myers | Oct. 7, 1924 |
| 1,747,134 | Posey | Feb. 11, 1930 |